June 12, 1956 C. H. NORDELL 2,750,044

SCREENING AND COMMINUTING DEVICE

Filed Dec. 17, 1951 8 Sheets-Sheet 2

Inventor
Carl H. Nordell,
By: Schneider & Dressler, Attys.

June 12, 1956 C. H. NORDELL 2,750,044

SCREENING AND COMMINUTING DEVICE

Filed Dec. 17, 1951 8 Sheets-Sheet 1

Inventor
Carl H. Nordell
By: Schneider & Dressler, Attys.

Inventor
Carl H. Nordell
By: Schneider & Dressler Attys.

June 12, 1956 C. H. NORDELL 2,750,044

SCREENING AND COMMINUTING DEVICE

Filed Dec. 17, 1951 8 Sheets-Sheet 4

Inventor:
Carl H. Nordell,
By: Schneider & Dressler, Attys.

Inventor,
Carl H. Nordell,
By: Schneider & Dressler, Attys.

June 12, 1956 C. H. NORDELL 2,750,044

SCREENING AND COMMINUTING DEVICE

Filed Dec. 17, 1951 8 Sheets-Sheet 6

Inventor,
Carl H. Nordell,
By: Schneider & Dressler, Attys

SCREENING AND COMMINUTING DEVICE

Inventor,
Carl H. Nordell,
By: Schneider & Dressler, Attys.

Inventor,
Carl H. Nordell,
By: Schneider & Dressler, Attys

United States Patent Office 2,750,044

Patented June 12, 1956

2,750,044

SCREENING AND COMMINUTING DEVICE

Carl H. Nordell, Palm Springs, Calif., assignor of fifteen per cent to Louise N. Millspaugh, Long Beach, and fifteen per cent to Anne N. Kaspor, Stafford Inn, Scotia, Calif.

Application December 17, 1951, Serial No. 261,973

14 Claims. (Cl. 210—152)

This invention relates to an apparatus for screening solids from a liquid stream, particularly a stream of sewage flowing into a sewage treatment plant, and for comminuting such solids out of contact with the screen.

In accordance with the present invention, an inclined stationary screen extending across the influent channel intercepts all solids too large to pass therethrough. The heavier solids carried by the stream, such as gravel or rocks, will drop to the bottom of the channel in advance of the screen, but the rest of the solids will normally accumulate against the screen and be held thereagainst by the inflowing sewage.

Further in accordance with the present invention, a combined transfer and comminuting unit mounted adjacent the frame supporting the screen is rotated in front of the screen to remove the solids from the face of the screen and transfer them to the comminuting elements to reduce them to such size that they will pass through the screen. The transfer and comminuting unit includes a rotating cylinder provided with projecting tines which are adapted to engage solids held against the screen to remove them from the face of the screen, and a series of teeth adapted to cooperate with a comb to comminute the solids removed from the screen to a size small enough so that they can be carried through the screen by the flow of liquid sewage.

The comminuting action referred to above takes place in an area or zone removed from the screen, above or in front of the screen, so that the screen is not subjected to the excessive wear incidental to the common practice of comminuting solids directly on the face of the screen. The comminution of solids away from the screen makes possible the use of a screen of relatively light construction, and thereby reduces the expense of the apparatus.

The cutting cylinder of the combined transfer and comminuting unit is made of a plurality of separate parts that are easily machined so that the replacement of any part of the cutting cylinder is easy and inexpensive. The rotation of the cutting cylinder is at a relatively high speed, and, while each tooth cuts only a small bit out of any solid, the comminution of each solid to the desired size is rapid.

While the description of the apparatus is drawn specifically to a combined transfer and comminuting device designed for use in a flowing stream of sewage, it should be understood that the apparatus is not necessarily limited to use in a stream of sewage, but may be used to separate solid matter from liquids wherever the solid matter may be screened from the liquid. Furthermore, the solid matter removed from the screen by the transfer device need not be comminuted, but may be removed from the liquid by any suitable means, such as a conveyor belt upon which the solid matter may be deposited by the transfer device.

The screen by which the solid matter is intercepted preferably comprises a plurality of parallel flat metal ribbons arranged edgewise in regularly spaced parallel relationship with each ribbon provided with a spring to hold it taut. The screen is sloped downwardly in the influent channel in the direction of the influent end, at a predetermined fixed angle, and the rotatable cylinder, which is rigidly fixed to the frame supporting the screen, extends upwardly from the upper surface of the screen. The screen is high enough to prevent any of the solids from flowing over its upper edge into the effluent channel without being first comminuted to a size small enough to flow through the screen with the incoming flow of liquid sewage.

The screen may be provided with a series of jets capable of blowing or washing the solids upwardly along the screen so that they may be engaged by the transfer tines which transfer the solids from the surface of the screen to the cutting comb so that they may be comminuted by the interaction of the comb and the projecting teeth of the cutting cylinder.

The arrangement of the transfer tines is such that they project between adjacent ribbons of the screen and engage the bottom edges of the solids to lift them into position so that they are engaged by the comb and the cutting teeth and are comminuted thereby. The tines are movable diametrically relative to the rotatable cylinder, being retracted within the cylinder as they rotate upwardly with the rotation of the cutting cylinder so that they pass underneath the comb as the rotation of the cutting cylinder carries them past the comb, and being projected from the cylinder as they rotate downwardly with the cylinder after they pass by the comb.

Although I have described the screen as comprising transversely spaced ribbons arranged longitudinally of the channel, it is obvious that many of the advantages of the invention may be attained with the screen elements arranged transversely of the channel and the rotatable cylinder disposed vertically in front of the screen.

The structure by which the above mentioned and other advantages of the invention are attained will be described in the following specification, taken in conjunction with the accompanying drawings, illustrating some preferred illustrative embodiments, in which.

Figure 2:
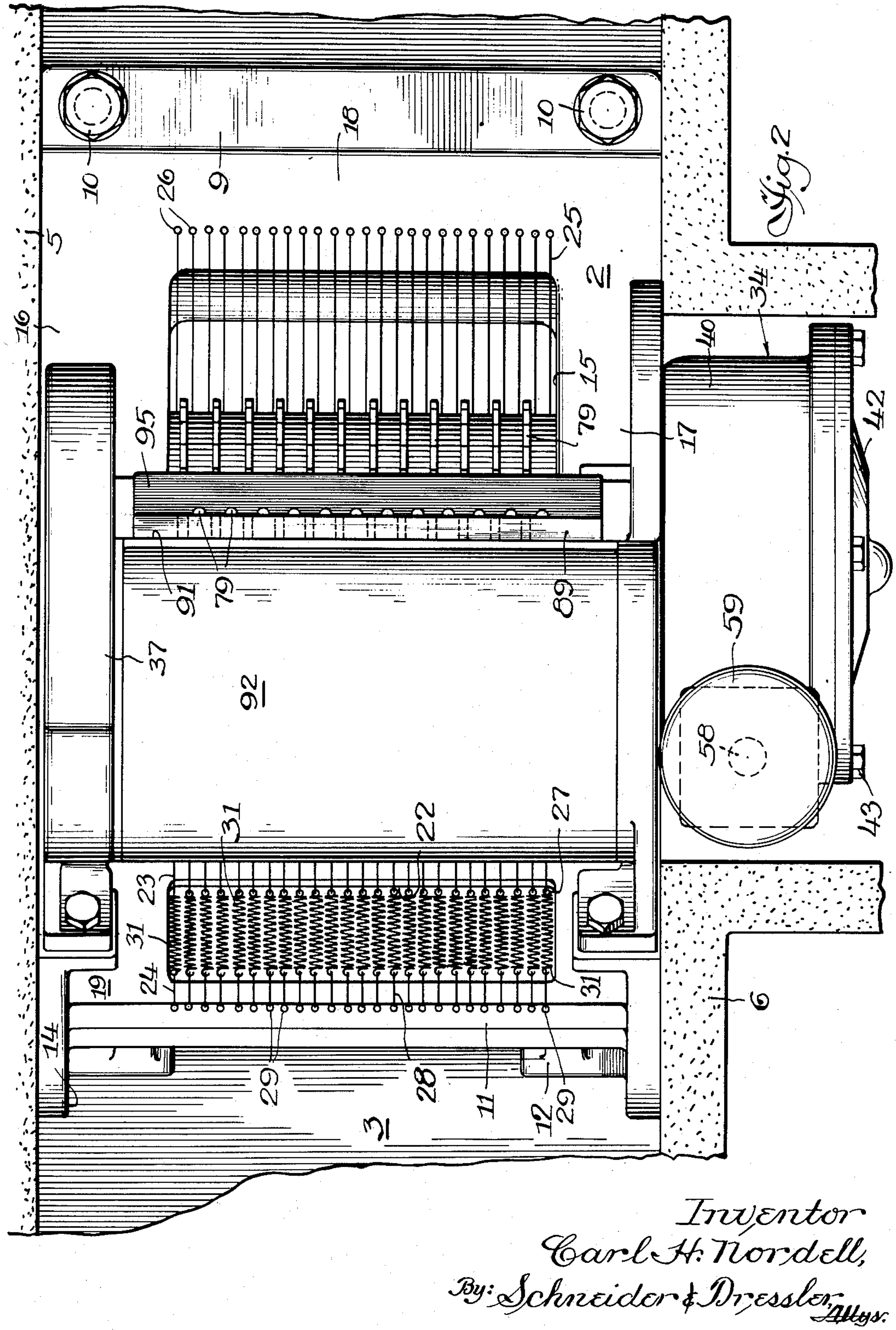
Figure 2 is a top plan view of the apparatus shown in Figure 1.

Referring to the drawings, reference numeral 2 indicates an influent channel through which flows unscreened sewage carrying solids, and 3 indicates the effluent channel through which the screened sewage flows. Channels 2 and 3 are parts of a single structure, preferably made of concrete, comprising a bottom wall 4 and side walls 5 and 6. Side wall 6 is provided with an outwardly extending bay 7 for a purpose hereinafter described. A frame 8, extending across the width of the channel 2 and sloping downwardly in a forwardly direction (in a direction towards the influent end of channel 2), has its lower edge 9 secured to the bottom wall 4 in any suitable manner, as by bolts 10. The upper edge 11 of frame 8 is rigidly secured to standards 12 bolted to the bottom wall 4, as indicated at 13. The upper edge of frame 8 may be provided with notches 14 adapted to fit over pins (not shown) projecting inwardly from walls 5 and 6 and supported thereby, but the standards 12 are preferred as a more substantial form of support.

The frame 8 is substantially rectangular and has a centrally disposed opening 15 surrounded by side edge panels 16 and 17, a bottom end panel 18 and a top end panel 19. The bottom end panel is provided with a plurality of equally spaced parallel slots 20, each of which extends forwardly from the lower edge of opening 15 into bottom end panel 18 and terminates in an enlarged hole 21. The upper end panel is provided with a transversely extending opening 22 of substantially the same width as that of the opening 15, and with a plurality of slots 23 and 24 which are aligned longitudinally with solts 20 and extend from the lower edge of panel 19 to the upper edge thereof. A plurality of flat metal ribbons 25 is arranged in the slots 20 and 23 to form a screen capable of intercepting solids flowing with the liquid sewage in the influent channel 2.

Figure 1:
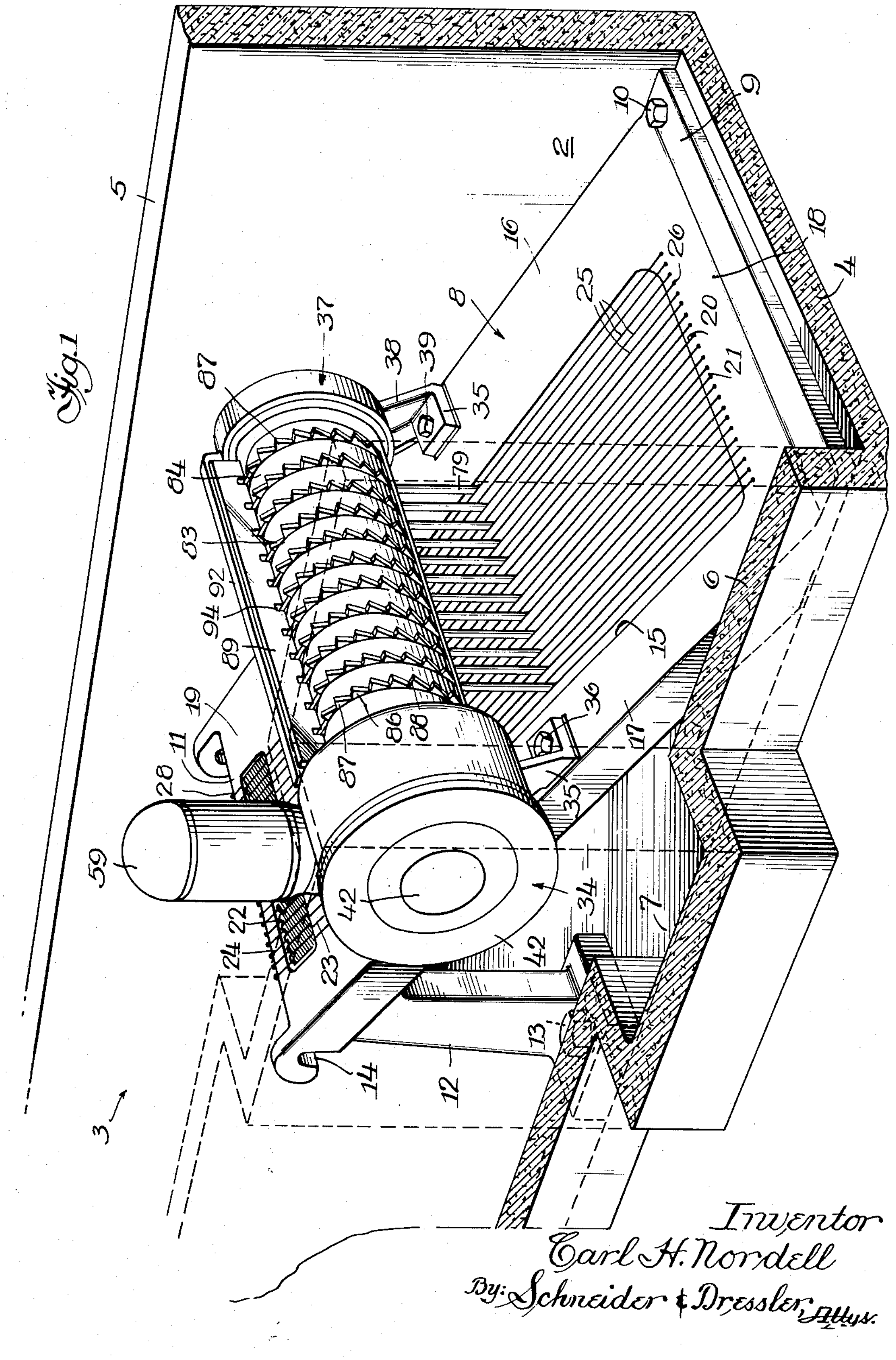
Figure 1 is a fragmentary perspective view of a channel through which sewage flows, an inclined stationary screen extending across the channel so as to intercept all solids too large to pass between the parallel metal ribbons comprising the screening elements, and a combined transfer and comminuting unit mounted in front of the screen, all in accordance with the present invention.
Figure 7:
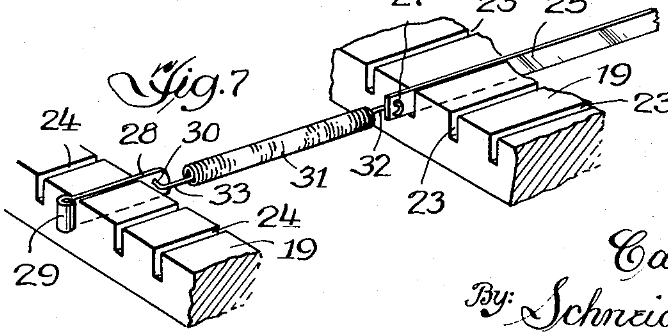
Figure 7 is a detail perspective view showing the means for securing the ends of the metal ribbons forming the screening elements and the spring means for holding the ribbons taut.

The screen arrangement can be best understood by referring to Figures 7 and 1. The slots 23 extend longitudinally along the top end panel 19 from the upper edge of opening 15 to the lower end of opening 22, and slots 24 extend from the upper edge of opening 22 to the upper edge of panel 19. Slots 20, 23 and 24 do not extend the full depth of frame 8, but are of sufficient width and depth to receive ribbons 25 in upright position so that the upper edge of each ribbon is substantially flush with the top surface of panel 8. The slots are wide enough to permit easy insertion of the ribbons, and narrow enough to keep them in their upright position. The lower end of each ribbon is curled to provide an enlarged end 26 adapted to fit snugly into opening 21 to prevent longitudinal displacement of the ribbons. The length of the ribbons is such that the upper end of each ribbon extends a short distance past the lower edge of opening 22. The upper end of each ribbon 25 is provided with an aperture 27.

A flat metal ribbon 28, similar to ribbons 25, is positioned in upright position in each slot 24. The upper end of ribbon 28 extends a short distance beyond the upper edge of panel 19 and is curled to provide an enlarged end 29, similar to enlarged end 26, which is positioned against the upper edge of panel 19. The lower end of ribbon 28 is provided with an aperture 30, similar to aperture 27. A coiled tension spring 31 has its opposite ends 32 and 33 threaded into apertures 27 and 30, respectively, thereby exerting constant force urging ribbons 25 and 28 towards each other to hold the ribbons taut. The metal ribbons and the spring are preferably made of corrosion resisting metal, but if any spring or ribbon becomes unfit to serve its intended function for any reason, it may be readily replaced.

The spring arrangement described is the presently preferred means for tensioning the ribbons because each ribbon 25 is individually tensioned, so as to insure substantially equal tautness of the ribbons despite the elastic deformations of the top and bottom cross supporting members which would otherwise cause the center ribbons to be less taut than the end ones. It is also possible to replace the ribbons with wires, but the ribbons are preferred because they can not be displaced sufficiently to permit passage of solids that might force their way between wire members.

Figure 3:
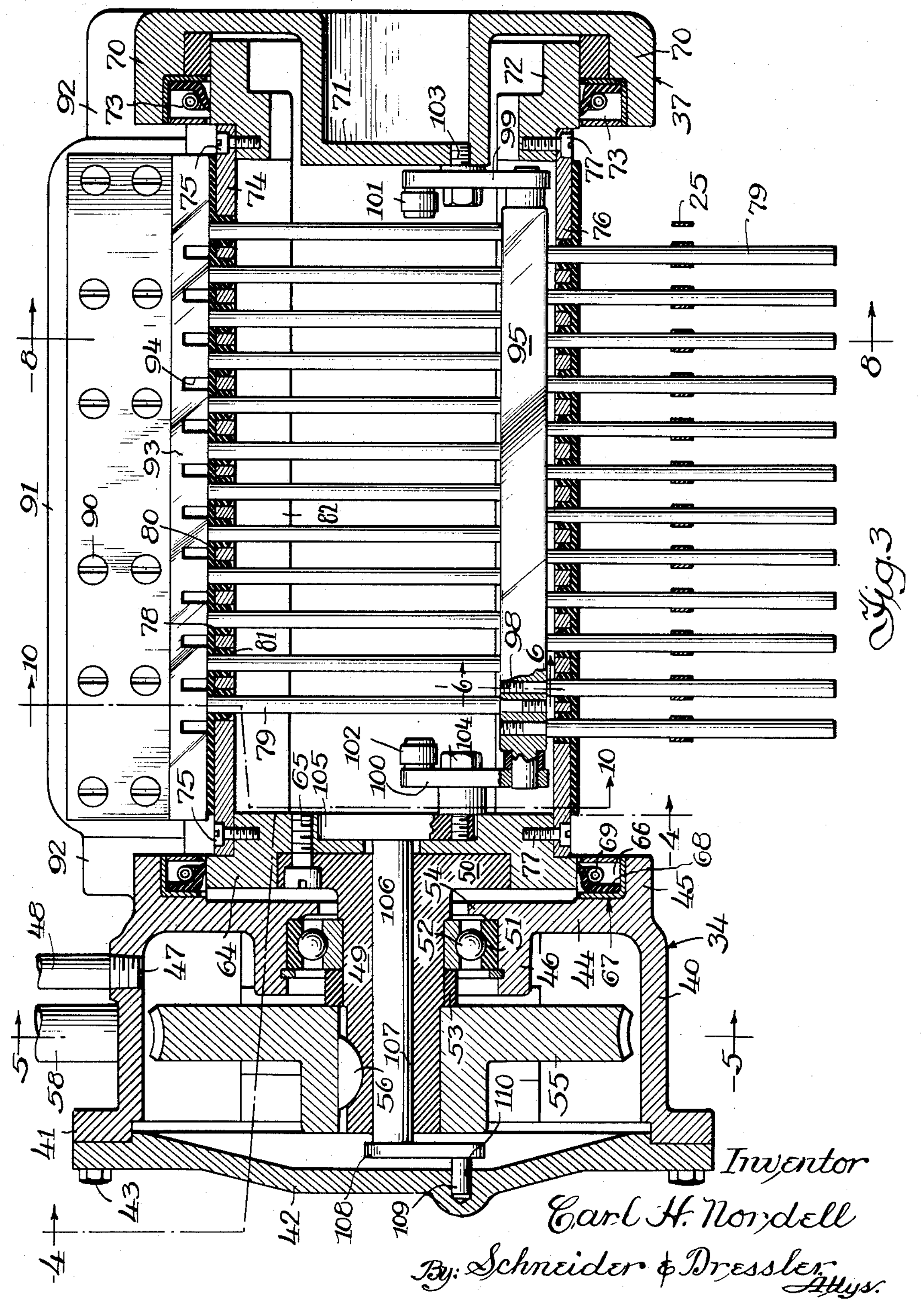
Figure 3 is an enlarged cross sectional view through the transfer and comminuting apparatus, taken generally along the line 3—3 of Figure 4.

A housing 34 is rigidly supported above frame 8 by brackets 35 bolted to the frame, as indicated at 36. Housing 34 extends laterally beyond the side edge of frame 8 into recess 7 provided in side wall 6 for this purpose. Another housing 37, axially aligned with housing 34, is similarly mounted above frame 8 by brackets 38 secured to the frame by bolts 39. The structure of housings 34 and 37 is best illustrated in Figure 3.

Housing 34 comprises a cup shaped frame member 40 having an annular flange 41 on one side to which a plate 42 is bolted, as indicated at 43. The opposite side of frame member 40 has an annular wall 44 extending inwardly. An annular flange 45 extends outwardly at right angles from the outer edge of wall 44, and another annular flange 46 extends inwardly at right angles to wall 44 adjacent its inner end. Frame member 40 is also provided with an opening 47 into which one end of an oil line 48 is threaded to provide lubrication for the moving parts, hereinafter described, housed within housing 34.

Figures 5, 6:
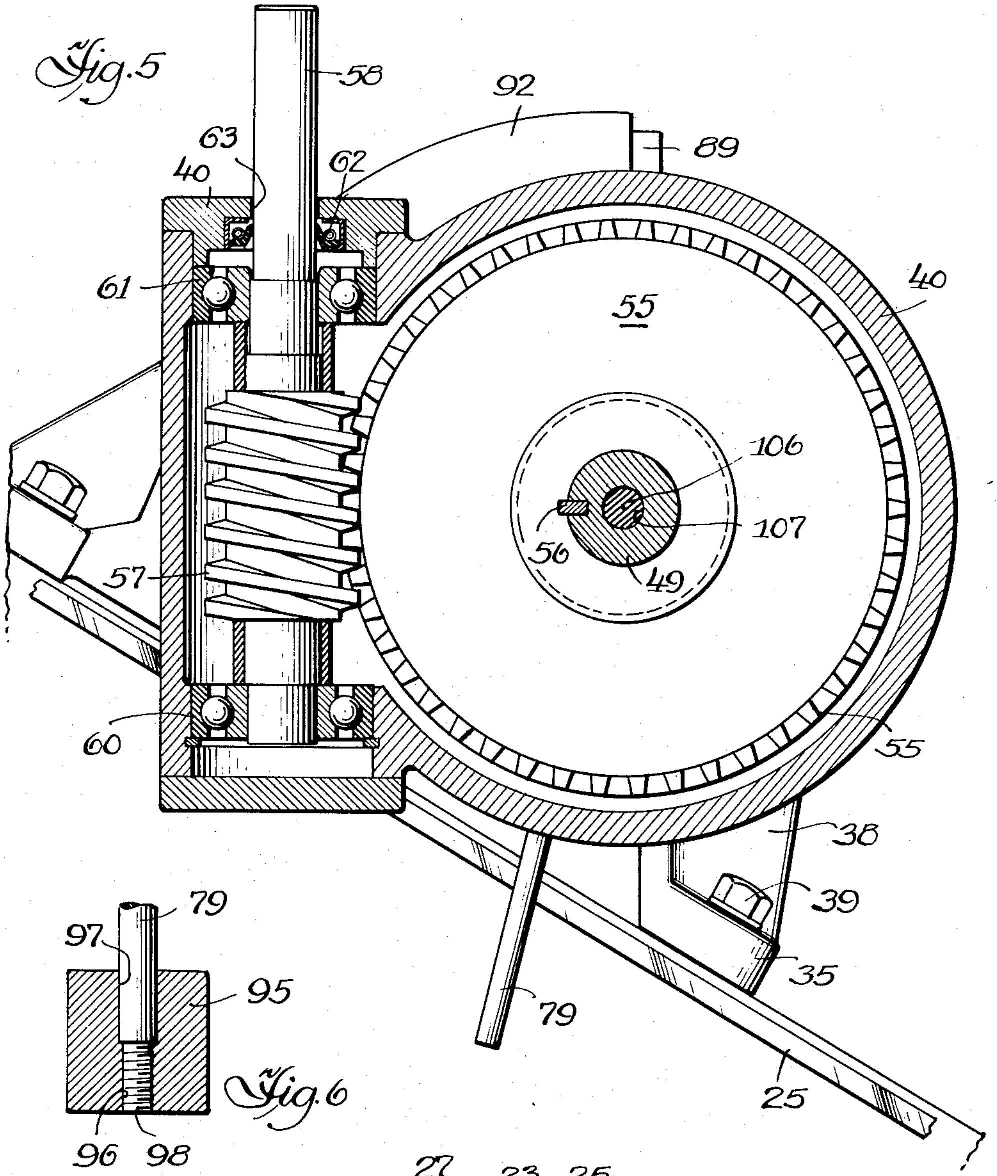
Figure 5 is a cross sectional view, taken along the line 5—5 of Figure 3, showing the worm drive for rotating the cutting cylinder.
Figure 6 is a cross sectional view, taken along the line 6—6 of Figure 3, showing the means for securing the transfer tines in the cutting cylinder.

A rotatable shaft 49 extends through the opening provided between the inner edges of annular wall 44. Shaft 49 projects beyond wall 44 and is provided with an integral enlarged end portion 50 which overlaps the inner end of wall 44 and is spaced therefrom. An annular bearing member 51, provided with ball bearings 52, spaces shaft 49 from annular flange 46. Bearing 51 is held laterally by a collar 53 and a portion 54 of wall 44 which projects beyond flange 46. A worm wheel 55 is mounted on shaft 49 and is keyed thereto, as indicated at 56. A worm gear 57, meshing with worm wheel 55, is mounted on a shaft 58 which projects through frame member 40 and is rotated by a motor 59 (Figure 1). As shown in Figure 5, the worm 57 rotates in bearings 60 and 61. A seal 62 surrounds shaft 58 adjacent the opening 63 in frame 40 through which shaft 58 projects.

An annular member 64 is rigidly secured to end portion 50 of shaft 49 by means of a plurality of screws 65 and is rotatable with shaft 49. An annular sealing member 66 fits between flange 45 and the outer periphery of annular member 64. Sealing member 66 comprises a casing 67, a flexible rubber member 68, and a garter spring 69 mounted in the casing and holding member 68 in wiping contact with the outer periphery of annular member 64.

Housing 37 comprises a cap having an annular flange 70 extending from its periphery towards housing 34 and a centrally disposed boss 71 projecting in the same direction. An annular member 72 is rotatably mounted within housing 37 and is spaced from the inner surface of flange 70 by an annular sealing member 73, similar in construction to sealing member 66.

A flat plate 74 is secured at its opposite ends to annular members 64 and 72 by means of screws 75. A similar flat plate 76 is secured by screws 77 to annular members 64 and 72 in diametrically opposed relationship to plate 74. Plates 74 and 76 are each provided with a series of apertures 78 through which transfer tines 79 project. A layer 80 of rubber or similar material is bonded to each plate 74 and 76 and extends into apertures 78 to provide a seal through which tines 79 may slide. The inner edges of seal 80 are feathered, as indicated at 81, to facilitate the sliding movement of the transfer tines. Seal 80 wipes the tines as they move inwardly and thereby prevents any of the solid matter from the sewage from adhering to the tines.

A pair of opposed shoes 82, secured between plates 74 and 76, form the base of a hollow cutting cylinder 83. A plurality of spacers 84 are secured to each shoe 82 by means of a plurality of screws 85. Cutting members 86 are secured between spacers 84. Each cutting member 86 is provided with a plurality of teeth 87 which project beyond the outer periphery of spacers 84. Teeth 87 are arranged like saw teeth, with the cutting edge 88 of each substantially at right angles to the periphery of the cylinder, so that each cutting edge is vertically disposed when it engages a comb 89 adapted to cooperate therewith to comminute the solid matter removed from the screen by transfer tines 79 and carried by them to the comb.

Comb 89 is rigidly secured, by screws 90 (Figures 3 and 10), to the front face 91 of a supporting arm 92 extending between housings 34 and 37 and supported thereby. The comb is positioned adjacent the top edge of cutting cylinder 83 so that it is spaced above the screen a distance approximately equal to the diameter of the cylinder. The lower front edge of comb 89, which is the portion interengaged by teeth 87 to comminute the solids from the sewage stream, is preferably provided with a hardened steel insert 93 to increase the life of the comb. Comb 89 is provided with a series of recesses 94 each of which is aligned with one of the cutting members 86.

Each transfer tine 79 has one end secured in a square bar 95 horizontally disposed within cutting cylinder 83. The tines are alternately arranged so that half of them extend in one direction at right angles to one surface of bar 95, and the other half extend in the opposite direction. Bar 95 is provided with a series of alternately arranged apertures 96 counterbored, as indicated at 97 (Figure 6). The counterbored portion 97 of each aperture is smooth to facilitate proper alignment of the tines, and the other portion of the aperture is threaded. Each tine has a reduced end portion 98 threaded to engage the thread in aperture 96.

The opposite ends of bar 95 are secured respectively to one end of crank arms 99 and 100 as shown in the drawings. Rollers 101 and 102 are secured to the opposite ends of crank arms 99 and 100 respectively. Crank 99 is rotatably secured to housing 37 by means of a bolt 103, and crank 100 is similarly secured, by a bolt 104, to a disk 105 positioned in a recess provided therefor in annular member 64. Disk 105 is rigidly secured to a stem 106 which extends through a bore 107 provided in shaft 49. An arm 108, rigidly secured to the opposite end of stem 106, has a pin 109 fixed thereto in offset relationship to the stem. Pin 109 fits in a recess 110 in plate 42 and holds stem 106 and disk 105 from rotating with shaft 49. Accordingly, bolts 103 and 104 provide stationary fulcrum points for cranks 99 and 100, respectively.

Figure 4:
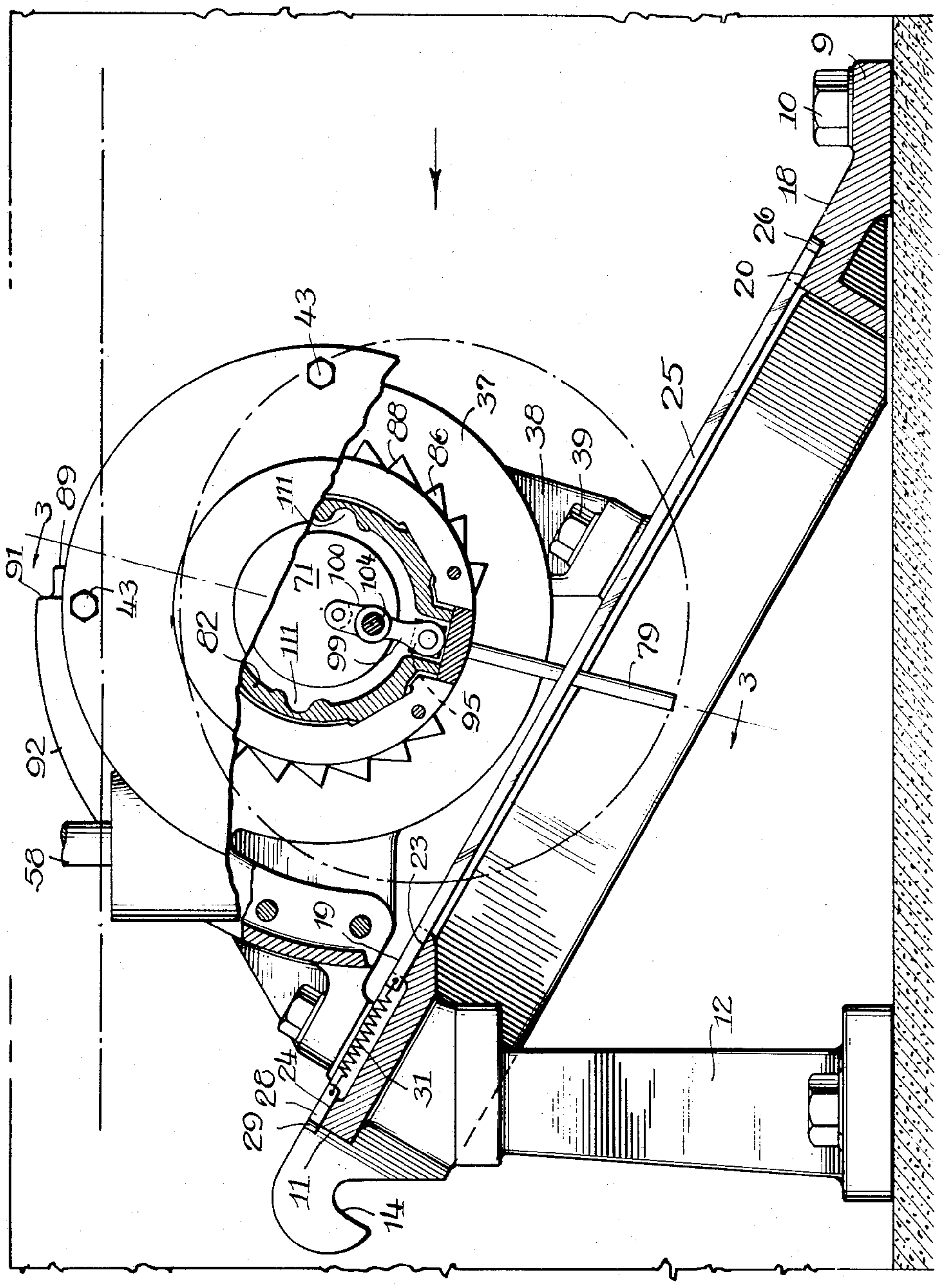
Figure 4 is a cross sectional view, taken along the line 4—4 of Figure 3 and showing the orbit of travel of the transfer tines.
Figure 9:
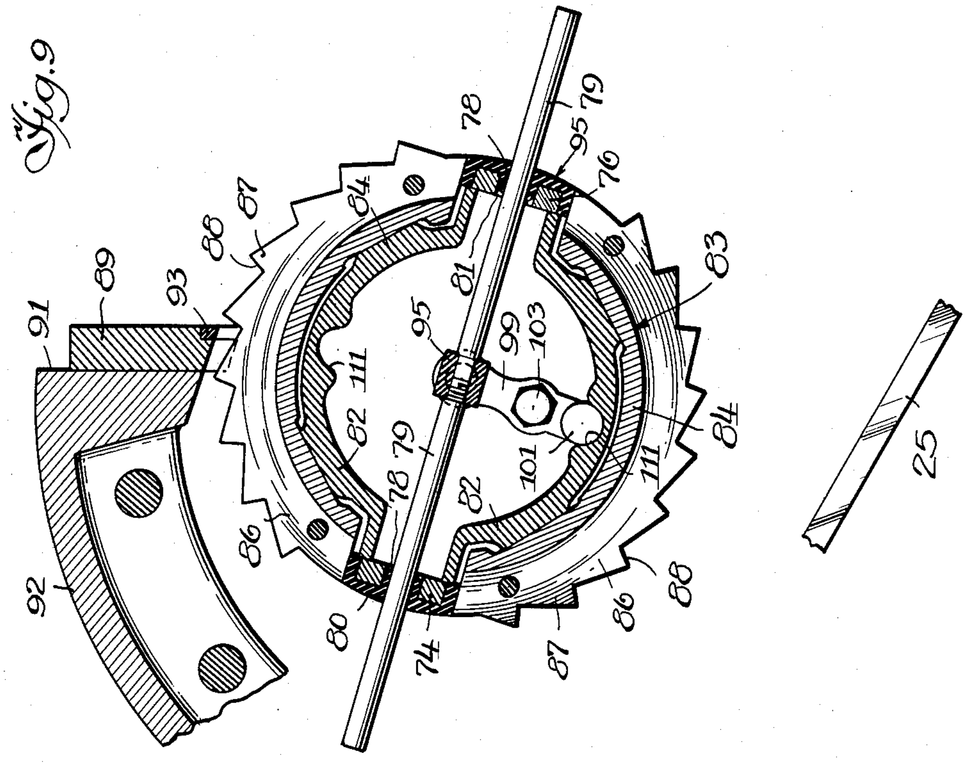
Figure 9 is a cross sectional view, similar to Figure 8, but showing a cylinder in a still different position.
Figure 8:
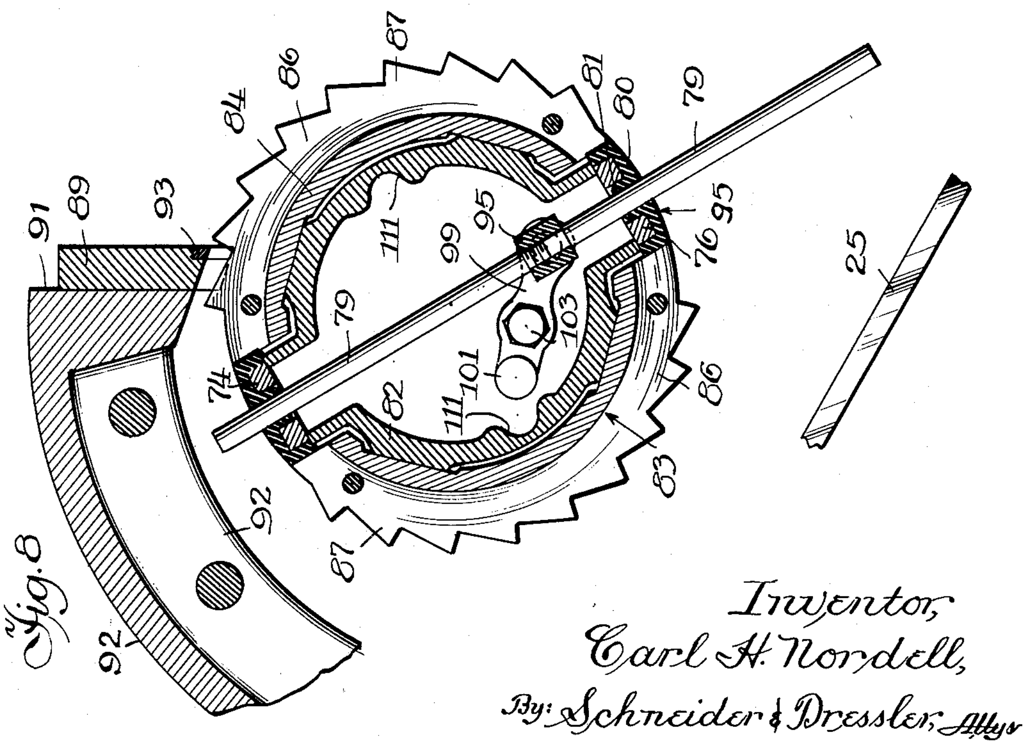
Figure 8 is a cross sectional view, taken generally along the line 8—8 of Figure 3, but showing the cylinder in a different position, to illustrate a different relationship of parts.

As the cutting cylinder 83 is rotated in the sewage stream, transfer tines 79 move with the cylinder because of their engagement with plates 74 and 76. The orbit of travel of the tines is substantially circular, as shown in Figure 4. The fixed positions of the fulcrums 103 and 104 of cranks 99 and 100 restrain bar 95 from moving freely and cause it to move diametrically upwardly, relative to the cylinder, from its lowermost position, shown in Figure 10, as the cylinder rotates counterclockwise from the position of Figure 10 towards the position of Figure 8. Continued rotation of cylinder brings the cranks 99 and 100 to a dead center position, as shown in Figure 9. Shoes 82 are each provided with a recess 111 positioned so that rollers 101 and 102 engage them when the cranks are in dead center position. Continued rotation of cylinder 83 causes the recessed portion of shoes 82 to move the cranks past dead center so that the rotation of the cylinder can never be impeded even when the cranks are in dead center position.

Figure 10:
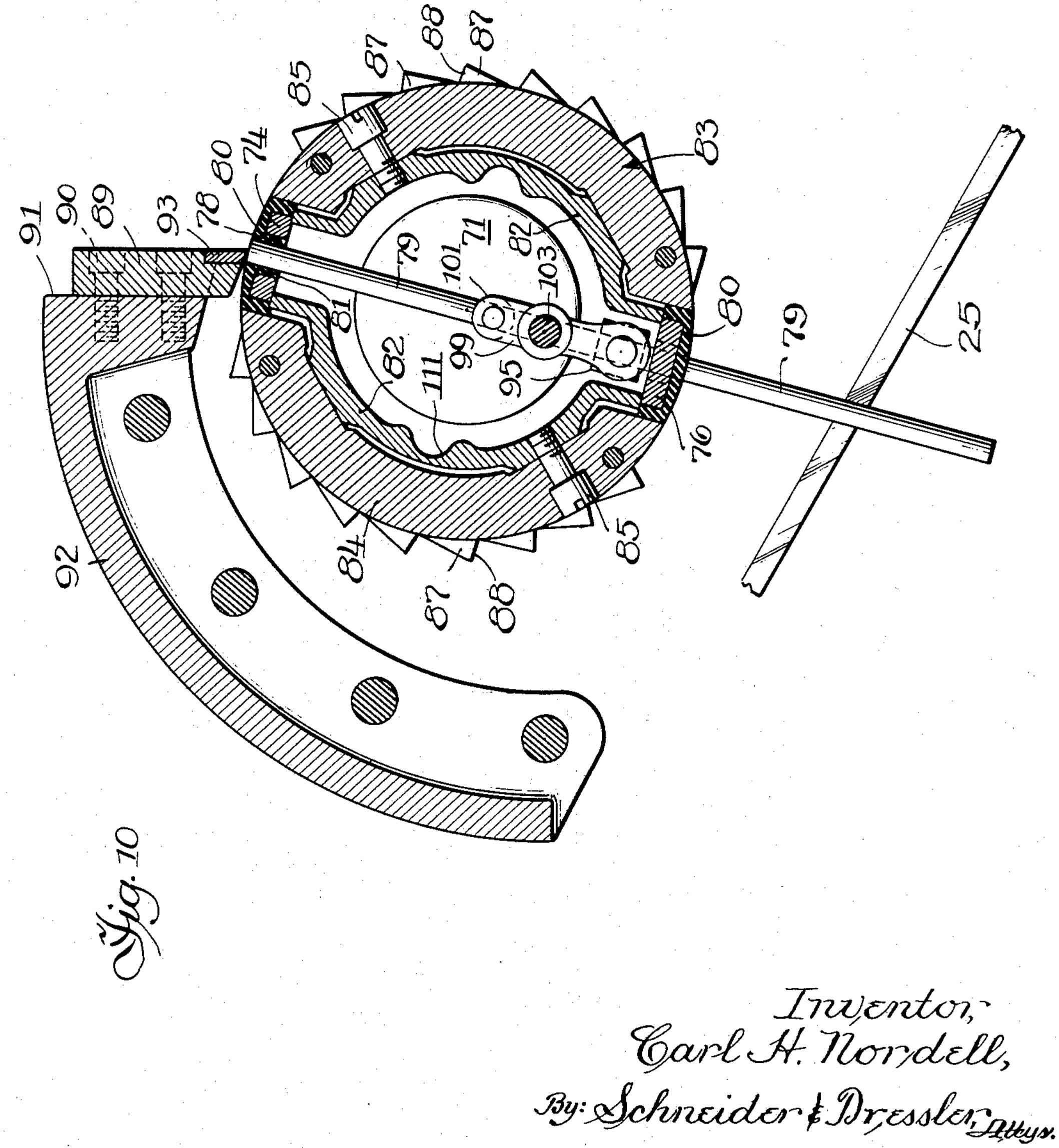
Figure 10 is a cross sectional view, taken along the line 10—10 of Figure 3.

Continued rotation of cylinder 83 past the dead center position shown in Figure 9 causes bar 95 to move closer to plate 74 until it again reaches its lowermost position, similar to that shown in Figure 10 except that bar 95 is adjacent plate 74 instead of being adjacent plate 76. The fixed fulcrums 103 and 104 prevent bar 95 from ever reaching past the center of the cylinder. When cylinder 83 is rotated past the dead center position of Figure 9, the diametric movement of bar 95 is downward relative to the cylinder because plate 74, towards which bar 95 moves, has moved downwardly below the horizontal position of plate 76. It will be seen, from a study of Figures 8, 9 and 10, that, as the cylinder rotates counterclockwise, the tines 79 which are being rotated upwardly in their substantially circular path are being moved downwardly diametrically relative to the interior of the cylinder because of their rigid connection to bar 95 which must move around the stationary pivots 103 and 104 as cylinder 83 is rotated.

The structure is so adjusted that at the time bar 95 is in its lowermost position adjacent plate 76, as shown in Figure 10, the transfer tines 79 projecting towards plate 74 are within the confines of cylinder 83 so that they can pass under the lower edge of comb 89. At the same time the tines projecting towards plate 76, which are also in their lowermost position, project downwardly between ribbons 25 of the screen. The counterclockwise movement of these tines causes them to pick up solid matter intercepted by the screen from the sewage stream and carry it from ribbons 25 towards comb 89. As the tines are retracted into cylinder 83 the solid matter is wiped from their surface by the seal 80 so that when the tines pass under the comb the solid matter which was lifted from the screen by the tines is positioned against the front surface of the comb where it is engaged by the cutting teeth 87 which cooperate with notches 94 in the comb to comminute it.

It is preferred that the interior of cylinder 83 be packed with grease. This serves the two-fold purpose of preventing entry of sewage into the interior of the cylinder through openings 80 and of keeping lubricated the moving parts within the cylinder.

Figure 11:
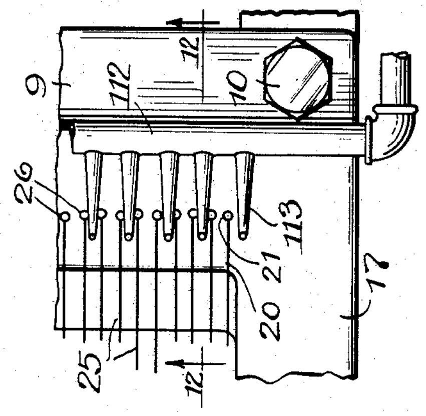
Figure 11 is a fragmentary top plan view of a modified embodiment of the invention, showing jets adjacent the lower edge of the screen to blow or wash the solids into the path of the transfer tines.
Figure 12:
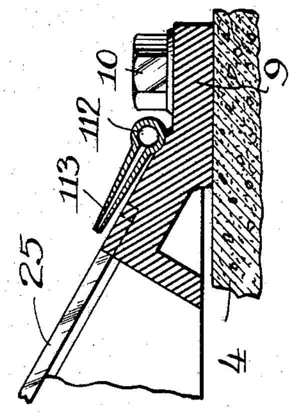
Figure 12 is a cross sectional view, taken along the line 12—12 of Figure 11.

In the modified embodiment of the invention shown in Figures 11 and 12, the only change from the previously described structure is the addition of a pipe line 112 adjacent the lower edge of frame 8. Pipe line 112 extends transversely across the frame and is provided with a plurality of jet nozzles 113 extending at right angles thereto in a plane parallel to but just above the plane of the screen. The pipe line is connected to a suitable source of either air or water so that a plurality of thin streams of either air or water may be blown through nozzles 113. The air or water blown through nozzles 113 has sufficient force to move the solids intercepted by the screen upwardly along the surface of the screen until such solids are engaged by the transfer tines which lift them and transfer them to the comminuting zone adjacent comb 89.

Figure 13:
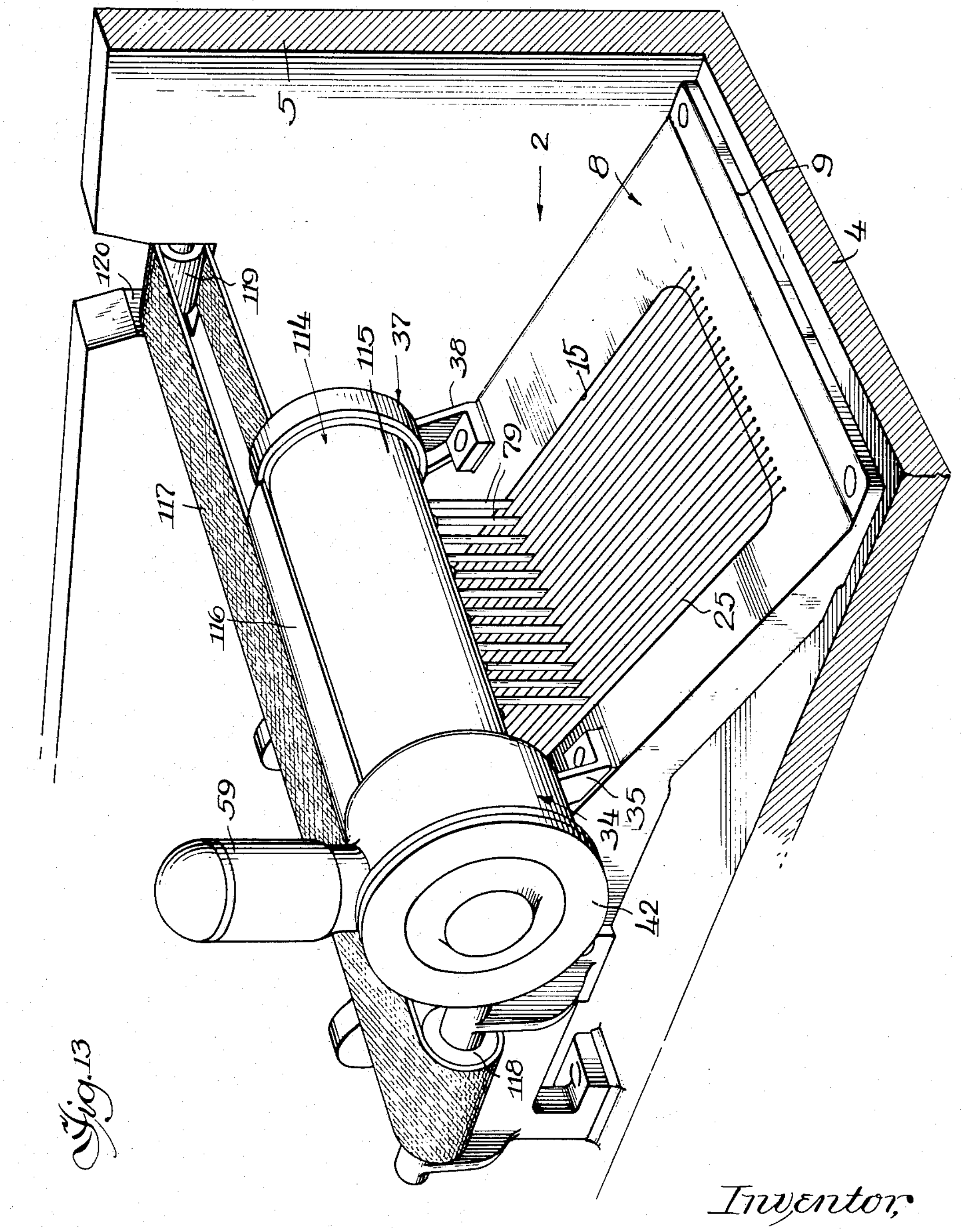
Figure 13 is a fragmentary perspective view, similar to Figure 1, showing a modified embodiment of the invention in which the comminuting apparatus is replaced by a conveyor belt which carries the solids from the screen to a point outside the influent channel where they may be disposed of in any suitable manner.

In the embodiment illustrated in Figure 13 the cutting cylinder 83 of the preferred embodiment is replaced by a cylinder 114 having a smooth surface 115. The cylinder 114 is mounted in housings 34 and 37 precisely as in the embodiment illustrated in Figures 1 to 10, and the transfer tines 79 are mounted within the cylinder in the manner previously described. A stripper plate 116 removes the solids transferred from the screen by tines 79, and causes them to fall on a conveyor belt 117 mounted on rollers 118 and 119. Side wall 5 is cut away, as indicated at 120, to permit the conveyor belt to carry the solids out of the influent channel. The conveyor is actuated by the same motor which rotates the cylinder. It is obvious that the jets of Figures 11 and 12 may be applied to the embodiment of Figure 13 just as well as to the embodiment of Figures 1 to 10.

While I have described preferred embodiments of my invention in considerable detail, it will be understood that the description is intended to be illustrative, rather than restrictive, as many details may be modified or changed without departing from the scope of the appended claims. Accordingly, I do not desire to be restricted to the exact structure described.

I claim:

1. In an apparatus for screening solids from a liquid containing solids, a screen comprising a frame and a plurality of transversely spaced metal ribbons held tautly in said frame, a cylinder rotatably mounted in front of said screen about an axis extending transversely of said metal ribbons, and a plurality of tines projecting radially from said cylinder, a comb extending along the side of said cylinder adjacent its upper edge, said tines being passable between said spaced metal ribbons upon rotation of said cylinder to transfer solids intercepted by said screen from said screen to said comb, a plurality of cutting members projecting from said cylinder and engageable with said comb to comminute said solids, and means for retracting said tines within the cylinder as said tines are moved towards said comb by the rotation of said cylinder, the outer ends of said tines being within said cylinder as they pass by said comb.

2. In an apparatus for screening solid matter from a liquid containing solids, a screen comprising a frame provided with a plurality of longitudinally extending slots spaced transversely across said frame, a metal ribbon disposed edgewise in each of said slots, one end of each of said ribbons being interengaged with corresponding ends of said slots to prevent longitudinal displacement of said ribbons, means for holding the opposite end of each of said ribbons under tension, a horizontally disposed cylinder rotatably mounted in front of said screen, and a plurality of tines projecting from said cylinder, said tines being passable between adjacent ribbons upon rotation of said cylinder to lift intercepted solid matter from said screen.

3. In an apparatus for comminuting solids, a rotatably mounted cylinder overlying a solids-retaining surface, a comb positioned adjacent an edge of said cylinder remote from said solids-retaining surface, a plurality of tines projecting through the peripheral surface of said cylinder, a plurality of cutting members projecting from said cylinder and engageable with said comb to comminute solid matter, means for rotating said cylinder and associated tines and cutting members in a direction to move the solids intercepted by said tines toward said comb where said comb and cutting members cooperate in comminuting the intercepted solids, and means for retracting said tines into said cylinder when said tines are adjacent said comb to avoid interference between said tines and comb and to extend said tines from said cylinder a sufficient distance to move same adjacent said solids-retaining surface when the tines have passed said comb.

4. In an apparatus for comminuting solids, a rotatably mounted cylinder overlying a solids-retaining surface, a comb positioned adjacent the upper edge of said cylinder, two series of apertures extending through the peripheral surface of said cylinder in diametrically opposed position, a bar positioned within said cylinder lengthwise thereof, a plurality of tines secured to opposite sides of said bar and extending outwardly therefrom through the said apertures, means for moving said bar and its associated tines diametrically, the diametric movement of said bar being such that the tines on one side thereof are retracted within said cylinder as they are moved adjacent said comb and the tines on the opposite sides thereof are projected from said cylinder as the cylinder is rotated, and means for rotating said cylinder, said cylinder carrying a plurality of projecting cutting members which are engageable with said comb as said cylinder rotates to comminute solid matter.

5. In combination with a channel through which a liquid containing solids is flowed, a screen extending across said channel to intercept solids too large to pass through said screen, a cylinder rotatably mounted in front of said screen, a comb positioned adjacent the upper edge of said cylinder, a pair of oppositely disposed housings at opposite ends of said cylinder, a crank arm pivotally mounted in each of said housings, a bar within said cylinder having its opposite ends secured to said crank arms whereby said bar is moved diametrically of said cylinder as said cylinder is rotated, two series of tines projecting through said cylinder along lines positioned at diametrically opposte sides of said cylinder, each of said tines having one end secured to said bar whereby said tines move diametrically of said cylinder as said cylinder is rotated, said crank arms being so positioned as to extend each series of tines when said series of tines is adjacent said screen, and to retract each series of tines when said series of tines is adjacent said comb.

6. In an apparatus for screening solids from a liquid containing solids, a screen, a cylinder rotatably mounted in front of said screen, a comb positioned above the upper edge of said cylinder and extending along one side thereof, two series of apertures extending through the peripheral surface of said cylinder in diametrically opposed position, a bar positioned within said cylinder, the ends of said bar being mounted on crank arms operable to move said bar diametrically relative to said cylinder when said cylinder is rotated, and a plurality of tines having their inner ends secured to said bar and their outer ends projecting through said apertures, the diametric movement of said bar being such that said tines are retracted within said cylinder as the cylinder moves same adjacent said comb.

7. In an apparatus for screening solid matter from a liquid containing solids, a screen, a cylinder rotatably mounted in front of said screen, a comb positioned above the upper edge of said cylinder and extending along one side thereof, said cylinder having two series of apertures extending through the peripheral surface thereof in diametrically opposed position, a bar within said cylinder, the ends of said bar being mounted on crank arms operable to move said bar diametrically relative to said cylinder when said cylinder is rotated, and a plurality of tines having their inner ends secured to said bar and their outer ends projecting through said apertures, the diametric movement of said bar being such that said tines are retracted within said cylinder as the cylinder is rotated to move the series of apertures therein through which the tines project upwardly, the tines projecting through each series of apertures extending outwardly a sufficient distance to engage the screen when the cylinder is rotated to bring that series of apertures adjacent the screen, said tines lifting from the screen solid matter intercepted by the screen from said liquid and moving said solid matter towards said comb as the rotation of said cylinder continues, the continued rotation of said cylinder causing said bar to retract said tines so that they pass below said comb and transfer said solid matter to the area adjacent the front edge of said comb as they pass.

8. In an apparatus for screening solid matter from a liquid containing solids, a screen, a cylinder rotatably mounted in front of said screen, a comb positioned above the upper edge of said cylinder and extending along the side thereof, said cylinder having two series of apertures extending through the peripheral surface thereof in diametrically opposed position, a bar within said cylinder, the ends of said bar being mounted on crank arms operable to move said bar diametrically relative to said cylinder when said cylinder is rotated, and a plurality of tines having their inner ends secured to said bar and their outer ends projecting through said apertures, the diametric movement of said bar being such that said tines are retracted within said cylinder as the cylinder moves same adjacent said comb, the tines projecting through each series of apertures extending outwardly a sufficient distance to engage the screen when the cylinder is rotated to bring that series of apertures adjacent the screen, said tines lifting from the screen solid matter intercepted by the screen from said liquid and moving said solid matter towards said comb as the rotation of said cylinder continues, the continued rotation of said cylinder causing said bar to retract said tines so that they pass below said comb and transfer said solid matter to the area adjacent the front edge of said comb as they pass, and a plurality of cutting members projecting from said cylinder and engageable with said comb to comminute said solid matter.

9. In an apparatus for transferring solids from a solids-retaining surface, a cylinder positioned above said solids-retaining surface and rotatable along an axis parallel to said surface, a solids receiving member positioned along a side of said cylinder remote from said surface, a bar mounted longitudinally within said cylinder and pivotally connected at opposite ends to respective crank arms having stationary pivot points, said pivot points being displaced from the axis of rotation of said cylinder in a direction remote from said solids-receiving member, respective means for carrying solids to said solids-receiving member extending radially from opposite sides of said bar and projecting through respective diametrically opposed apertures in the surface of said cylinder and means for rotating said cylinder whereby said radially extending means are retracted into said cylinder when they are moved adjacent said solids-receiving member and are extended to contact the solids on said solids-retaining surface when they are opposite said latter surface.

10. The combination of a solids-retaining surface, a cylinder rotatably mounted above said surface, a plurality of tines in said cylinder extendable through openings in the peripheral surface of said cylinder, means for continuously rotating said cylinder and tines, and means within said cylinder for moving each of said tines longitudinally of its axis to retract said tines within said cylinder at a predetermined point in the rotation of said cylinder when the openings of said cylinder, through which the tines normally project, pass structures positioned closely adjacent the peripheral surface of said cylinder and to extend said tines when same are adjacent said solids-retaining surface to pass through said solids-retaining surface and to remove solid matter from said surface, the walls of said cylinder defining said openings fitting closely about said tines to wipe the solids clinging to said tines upon retraction thereof within said cylinder.

11. In an apparatus for communiting solids, a rotatably mounted cylinder overlying a solids-retaining surface, a comb positioned adjacent an edge of said cylinder remote from said solids-retaining surface, two series of apertures extending through the peripheral surface of said cylinder in diametrically opposed position, a plurality of tines aligned with said apertures, a plurality of cutting members projecting from said cylinder and engageable with said comb to comminute solid matter, means for rotating said cylinder and associated tines and cutting members in a direction to move the solids intercepted by said tines toward said comb where said comb and cutting members cooperate in comminuting the intercepted solids, and means for retracting the tines aligned with one of said series of apertures into said cylinder when said tines are adjacent said comb to avoid interference between said tines and comb and to simultaneously extend the tines aligned with the other series of apertures from said cylinder a sufficient distance to move same adjacent said solids-retaining surface to intercept solids when the tines have passed said comb.

12. In an apparatus for comminuting solids, a rotatably mounted cylinder overlying a screen, a comb positioned adjacent an edge of said cylinder remote from said screen, a plurality of tines projecting through the peripheral surface of said cylinder, said tines being passable through said screen upon rotation of said cylinder, a plurality of cutting members projecting from said cylinder and engageable with said comb to comminute solid matter, means for rotating said cylinder and associated tines and cutting members in a direction to move the solids intercepted by said tines toward said comb where said comb and cutting members cooperate in comminuting the intercepted solids, and means for retracting said tines into said cylinder when said tines are adjacent said comb to avoid interference between said tines and comb and to extend said tines from said cylinder a sufficient distance to move same through said screen to intercept solids when the tines have passed said comb.

13. In an apparatus for comminuting solids, a rotatably mounted cylinder overlying a screen, a comb positioned adjacent an edge of said cylinder remote from said screen, two series of apertures extending through the peripheral surface of said cylinder in diametrically opposed position, a plurality of tines aligned with said apertures, said tines being passable through said screen upon rotation of said cylinder, a plurality of cutting members projecting from said cylinder and engageable with said comb to comminute solid matter, means for rotating said cylinder and associated tines and cutting members in a direction to move the solids intercepted by said tines toward said comb where said comb and cutting members cooperate in comminuting the intercepted solids, and means for retracting the tines aligned with one of said series of apertures into said cylinder when said tines are adjacent said comb to avoid interference between said tines and comb and to simultaneously extend the tines aligned with the other series of apertures from said cylinder a sufficient distance to move same through said screen to intercept solids when the tines have passed said comb.

14. In an apparatus for screening solids from a liquid containing solids, a screen comprising a plurality of transversely spaced longitudinally extending screen elements, a cylinder rotatably mounted in front of said screen, means for rotating said cylinder, a plurality of tines mounted within said cylinder, and means for reciprocating said tines diametrically of said cylinder upon rotation of the cylinder to project them laterally beyond the periphery of said cylinder and to retract them into position within said cylinder, said tines being passable from a position below said screen to a position above said screen through the spaces between adjacent screen elements when in projected position, upon rotation of said cylinder, to remove solids intercepted from said liquid by said screen.

References Cited in the file of this patent

UNITED STATES PATENTS

| | | |
|---|---|---|
| 369,434 | Chrisholm | Sept. 6, 1887 |
| 1,143,496 | Briles | June 15, 1915 |
| 1,615,559 | Task | Jan. 25, 1927 |
| 1,739,701 | Wilson | Dec. 17, 1929 |
| 1,794,504 | Van Norman | Mar. 3, 1931 |
| 2,009,005 | Schofield et al. | July 23, 1935 |
| 2,086,821 | Raisch | July 13, 1937 |
| 2,090,997 | French | Aug. 24, 1937 |
| 2,141,662 | Ossing et al. | Dec. 27, 1938 |
| 2,317,416 | Stanley | Apr. 27, 1943 |
| 2,603,354 | Way et al. | July 15, 1952 |
| 2,614,695 | Nordell | Oct. 21, 1952 |

FOREIGN PATENTS

| | | |
|---|---|---|
| 322,935 | Germany | July 12, 1920 |